United States Patent
Black et al.

(10) Patent No.: US 7,729,714 B2
(45) Date of Patent: Jun. 1, 2010

(54) METHOD AND APPARATUS FOR REVERSE LINK TRANSMIT BEAM-FORMING

(75) Inventors: Peter John Black, San Diego, CA (US); Mingxi Fan, San Diego, CA (US); Yeliz Tokgoz, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1027 days.

(21) Appl. No.: 11/313,320

(22) Filed: Dec. 20, 2005

(65) Prior Publication Data

US 2007/0142074 A1    Jun. 21, 2007

(51) Int. Cl.
  *H04B 7/00* (2006.01)
  *H04Q 7/20* (2006.01)

(52) U.S. Cl. .................. 455/522; 455/13.4; 455/69; 455/67.11

(58) Field of Classification Search .............. 455/562.1, 455/561, 522, 442, 78, 101, 447, 450, 509, 455/67.16, 67.11, 126, 69, 13.4, 452.2, 422.1; 370/252, 332–334, 328
See application file for complete search history.

(56) References Cited

U.S. PATENT DOCUMENTS

| | | | |
|---|---|---|---|
| 6,678,257 B1 | 1/2004 | Vijayan et al. | |
| 6,687,510 B2 | 2/2004 | Esteves et al. | |
| 7,239,847 B2* | 7/2007 | Attar et al. | 455/63.1 |
| 2004/0095908 A1* | 5/2004 | Wu et al. | 370/335 |
| 2005/0054366 A1* | 3/2005 | Chen et al. | 455/522 |
| 2005/0201332 A1* | 9/2005 | Bakshi et al. | 370/333 |
| 2006/0135079 A1 | 6/2006 | Barnett et al. | |

FOREIGN PATENT DOCUMENTS

| | | | |
|---|---|---|---|
| WO | WO0299999 | * | 12/2002 |
| WO | 03007502 | | 1/2003 |
| WO | 05039233 | | 4/2005 |

OTHER PUBLICATIONS

International Search Report - PCT/US06/062128, International Searching Authority - European Patent Office, Jan. 23, 2008.
Written Opinion - PCT/US06/062128, International Searching Authority - European Patent Office, Jan. 23, 2008.

* cited by examiner

*Primary Examiner*—Sujatha Sharma
(74) *Attorney, Agent, or Firm*—Kenneth Vu

(57) ABSTRACT

A method and system for reverse link transmit beam-forming. One method comprises using a plurality of antennas at an access terminal to wirelessly transmit signals to one or more base stations; receiving an input indicating a reverse link signal quality at the one or more base stations; and adjusting at least one of a gain and a phase of a signal to be transmitted on one or more antennas. The input may be a reverse power control (RPC) value sent from one or more base stations or a measurement of the closed-loop pilot transmit power.

20 Claims, 7 Drawing Sheets

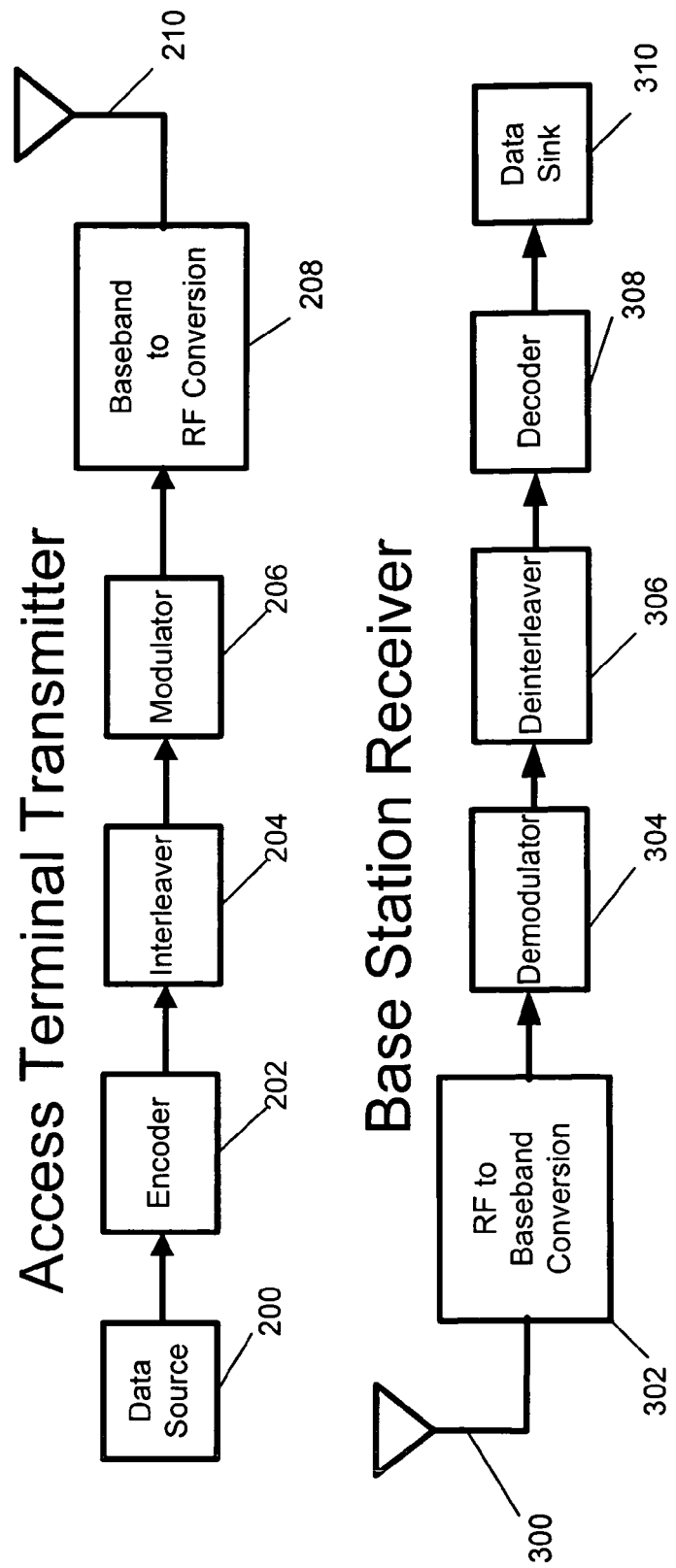

METHOD AND APPARATUS FOR REVERSE LINK TRANSMIT BEAM-FORMING

FIELD

The present invention relates to wireless communication systems generally, and specifically to beam-forming in wireless communication systems.

BACKGROUND

A communication system may provide communication between base stations and access terminals. Forward link or downlink refers to transmission from a base station to an access terminal. Reverse link or uplink refers to transmission from an access terminal to a base station. Each access terminal may communicate with one or more base stations on the forward and reverse links at a given moment, depending on whether the access terminal is active and whether the access terminal is in soft handoff.

BRIEF DESCRIPTION OF DRAWINGS

Like reference numerals and characters may identify the same or similar objects.

FIG. 2 illustrates an example of a transmitter structure and/or process, which may be implemented at an access terminal of FIG. 1.

FIG. 3 illustrates an example of a receiver process and/or structure, which may be implemented at a base station of FIG. 1.

DETAILED DESCRIPTION

Each embodiment described herein is not necessarily preferable or advantageous over other embodiments. While various aspects of the present disclosure are presented in drawings, the drawings are not necessarily drawn to scale or drawn to be all-inclusive. Components of one structure may be combined or replaced with one or more components of another structure. Operations of one method may be combined or replaced with one or more operations of another method.

Figure 1:
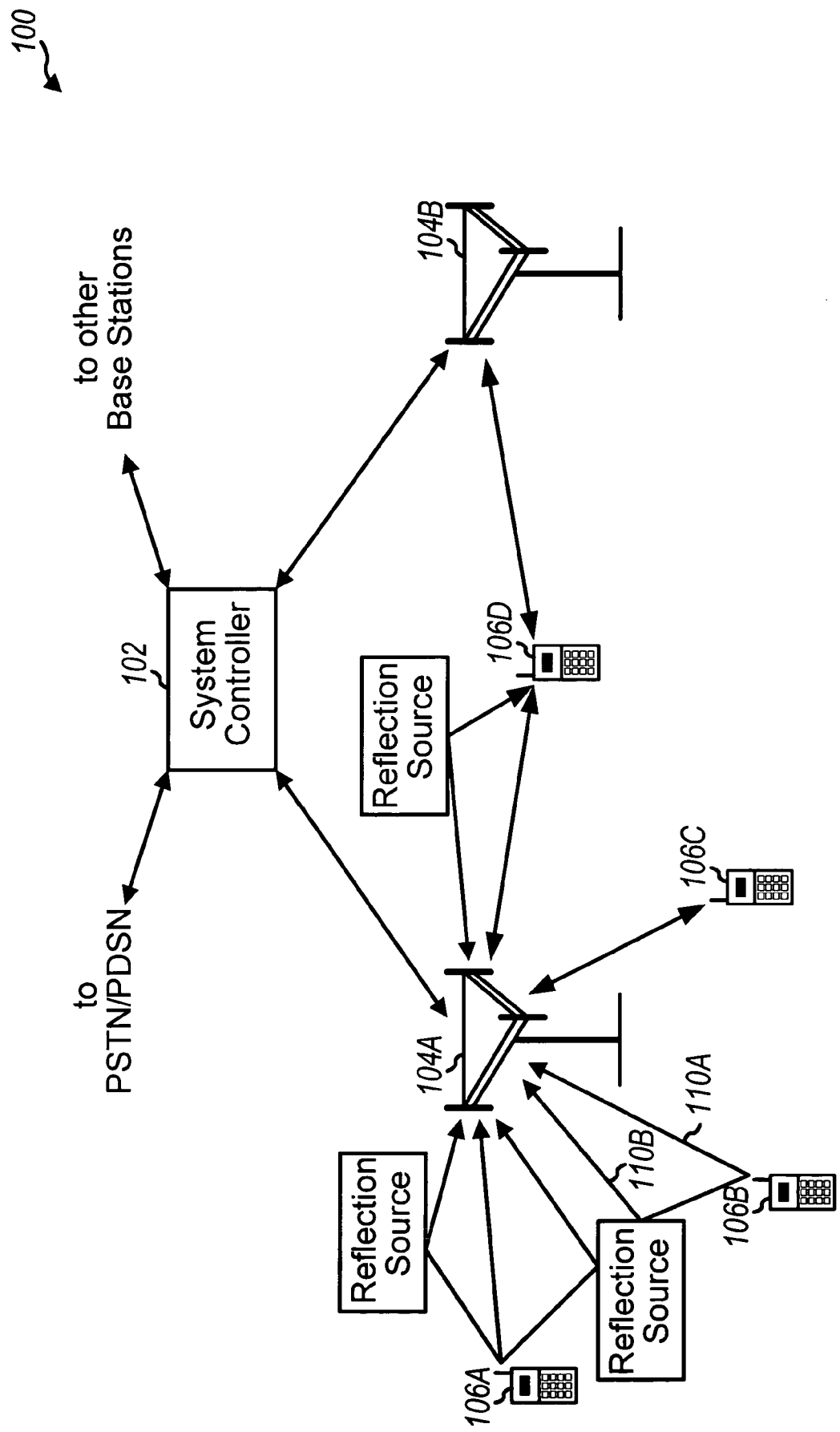
FIG. 1 illustrates a wireless communication system including a controller, base stations and access terminals.

FIG. 1 illustrates a wireless communication system 100, which includes a system controller 102, base stations 104A-104B, and a plurality of access terminals 106A-106D. The system 100 may have any number of controllers 102, base stations 104 and access terminals 106. Various aspects and embodiments described herein may be implemented in the system 100.

The access terminals 106 may be mobile or stationary and may be dispersed throughout the communication system 100 of FIG. 1. An access terminal 106 may be connected to or implemented in a computing device, such as a laptop computer. Alternatively, an access terminal may be a self-contained data device, such as a personal digital assistant (PDA), a wired phone, a wireless phone, a cellular phone, a wireless communication personal computer (PC) card, an external or internal modem, etc. An access terminal may be any device that provides data connectivity to a user by communicating through a wireless channel or through a wired channel, such as fiber optic or coaxial cables. An access terminal may have various names, such as mobile station, access unit, subscriber unit, mobile device, mobile terminal, mobile unit, mobile phone, mobile, remote station, remote terminal, remote unit, user device, user equipment, handheld device, etc.

The system 100 provides communication for a number of cells. Each cell is serviced by one or more base stations 104. A base station 104 may also be called a base station transceiver system (BTS), an access point, a part of an access network, a modem pool transceiver (MPT), or a Node B. Access network may refer to any network equipment providing data connectivity between a packet switched data network (PSDN) (e.g., the Internet) and the access terminals 106. Forward link (FL) or downlink refers to transmission from a base station 104 to an access terminal 106. Reverse link (RL) or uplink refers to transmission from an access terminal 106 to a base station 104.

A base station 104 may transmit data to an access terminal 106 using a data rate selected from a set of different data rates. An access terminal 106 may measure a signal-to-interference-and-noise ratio (SINR) of a pilot signal sent by the base station 104 and determine a desired data rate for the base station 104 to transmit data to the access terminal 106. The access terminal 106 may send data request channel or data rate control (DRC) messages to the base station 104 to inform the base station 104 of the desired data rate.

The system controller 102 (also referred to as a base station controller (BSC)) may provide coordination and control for base stations 104, and may further control routing of calls to access terminals 106 via the base stations 104. The system controller 102 may be further coupled to a public switched telephone network (PSTN) via a mobile switching center (MSC), and to a packet data network via a packet data serving node (PDSN).

The communication system 100 may use one or more communication techniques, protocols or standards, such as code division multiple access (CDMA), IS-95, High Rate Packet Data (HRPD), also referred to as High Data Rate (HDR), as specified in "cdma2000 High Rate Packet Data Air Interface Specification," TIA/EIA/IS-856, CDMA 1× Evolution Data Optimized (EV-DO), 1×EV-DV, Wideband CDMA (WCDMA), Universal Mobile Telecommunications System (UMTS), Time Division Synchronous CDMA (TD-SCDMA), Orthogonal Frequency Division Multiplexing (OFDM), etc. Some of the examples described below may refer to cdma2000 1× and 1× EV-DO for clarity of understanding. The ideas presented herein are applicable to other systems as well, and the present examples are not meant to limit the present application.

FIG. 2 illustrates an example of a transmitter structure and/or process, which may be implemented at an access terminal 106 of FIG. 1. The functions and components shown in FIG. 2 may be implemented by software, hardware, or a combination of software and hardware. Other functions may be added to FIG. 2 in addition to or instead of the functions shown in FIG. 2.

A data source 200 provides data to an encoder 202, which encodes data bits using one or more coding schemes to provide coded data chips. Each coding scheme may include one or more types of coding, such as cyclic redundancy check (CRC), convolutional coding, Turbo coding, block coding, other types of coding, or no coding at all. Some coding schemes may use automatic repeat request (ARQ), hybrid ARQ (H-ARQ), and incremental redundancy repeat techniques. Different types of data may be coded with different coding schemes. An interleaver 204 interleaves the coded data bits to combat fading.

A modulator 206 modulates coded, interleaved data to generate modulated data. Examples of modulation techniques include binary phase shift keying (BPSK) and quadrature phase shift keying (QPSK). The modulator 206 may also repeat a sequence of modulated data or a symbol puncture unit may puncture bits of a symbol. The modulator 206 may also spread the modulated data with a Walsh cover (i.e., Walsh code) to form data chips. The modulator 206 may also time-division multiplex (TDM) data chips with pilot chips and medium access control (MAC) chips to form a stream of chips. The modulator 206 may also use a pseudo random noise (PN) spreader to spread the stream of chips with one or more PN codes (e.g., short codes and a long code).

A baseband-to-radio-frequency (RF) conversion unit 208 may convert baseband signals to RF signals for transmission via one or more antennas 210 over a wireless communication link to one or more base stations 104. Multiple antennas 210 may be used for transmit beam-forming, as described below.

FIG. 3 illustrates an example of a receiver process and/or structure, which may be implemented at a base station 104 of FIG. 1. The functions and components shown in FIG. 3 may be implemented by software, hardware, or a combination of software and hardware. Other functions may be added to FIG. 3 in addition to or instead of the functions shown in FIG. 3.

One or more antennas 300 receive the reverse link modulated signals from one or more access terminals 106. Multiple antennas may provide spatial diversity against deleterious path effects such as fading. Each received signal is provided to a respective receiver or RF-to-baseband conversion unit 302, which conditions (e.g., filters, amplifies, downconverts) and digitizes the received signal to generate data samples for that received signal.

A demodulator 304 may demodulate the received signals to provide recovered symbols. For cdma2000, demodulation tries to recover a data transmission by (1) channelizing the despread samples to isolate or channelize the received data and pilot onto their respective code channels, and (2) coherently demodulating the channelized data with a recovered pilot to provide demodulated data.

A deinterleaver 306 deinterleaves data from the demodulator 304. A decoder 308 attempts to decode the demodulated data to recover decoded data bits transmitted by the access terminal 106. The decoded data may be provided to a data sink 310.

Figure 4:
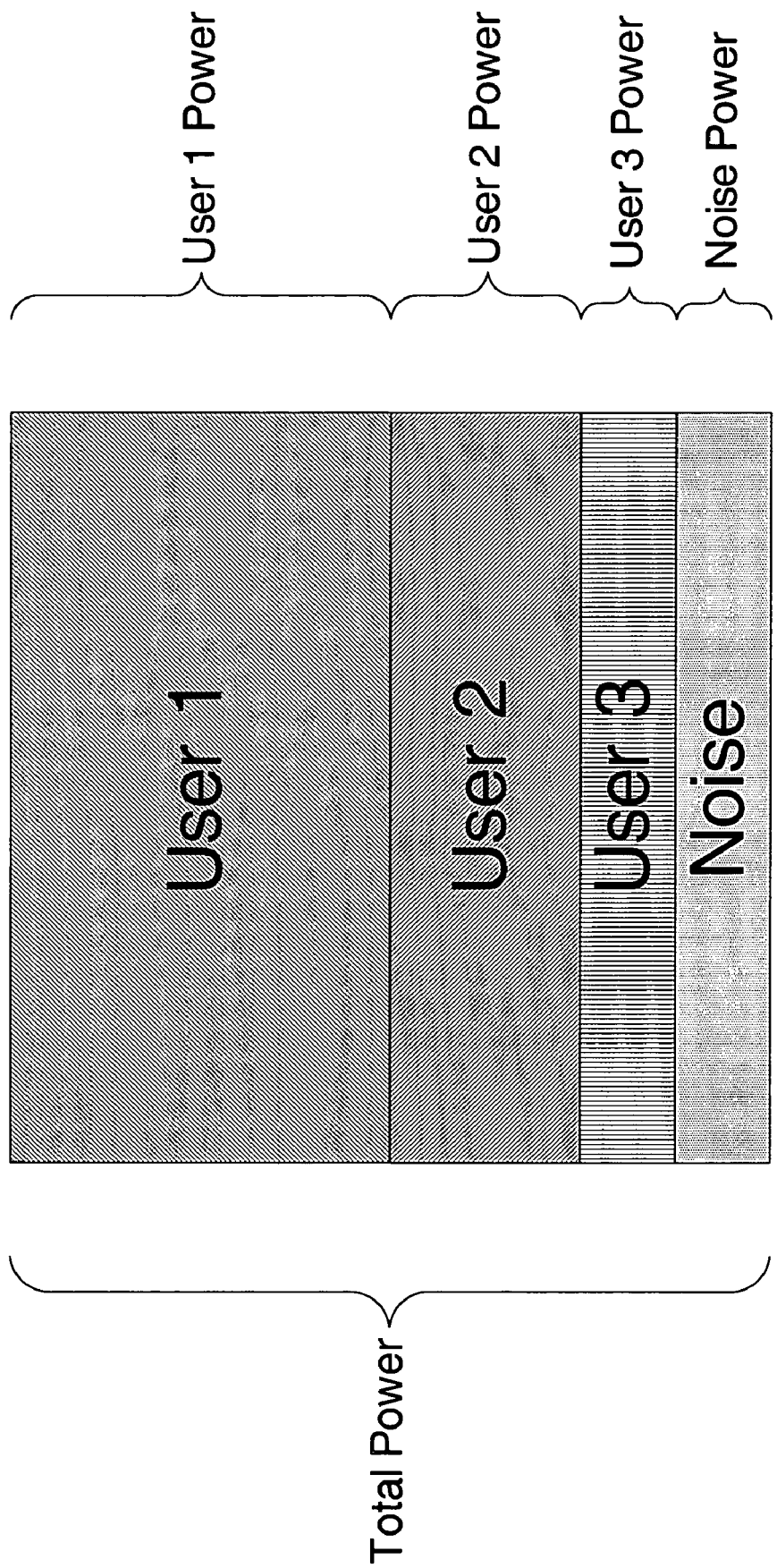
FIG. 4 illustrates an example of total power transmitted from three access terminal users and noise in the system of FIG. 1.

FIG. 4 illustrates an example of total power (power distribution) transmitted from three access terminal users (user 1, user 2, user 3) and noise in the system of FIG. 1. Each user may be instructed by a base station to use a particular transmit power, e.g., user 3 transmits at a power substantially equal to noise; user 2 transmits at a power substantially equal to user 3's power plus noise; and user 1 transmits at a power substantially equal to user 2 plus user 3 plus noise.

RL Transmit Beam-Forming

Figure 5:
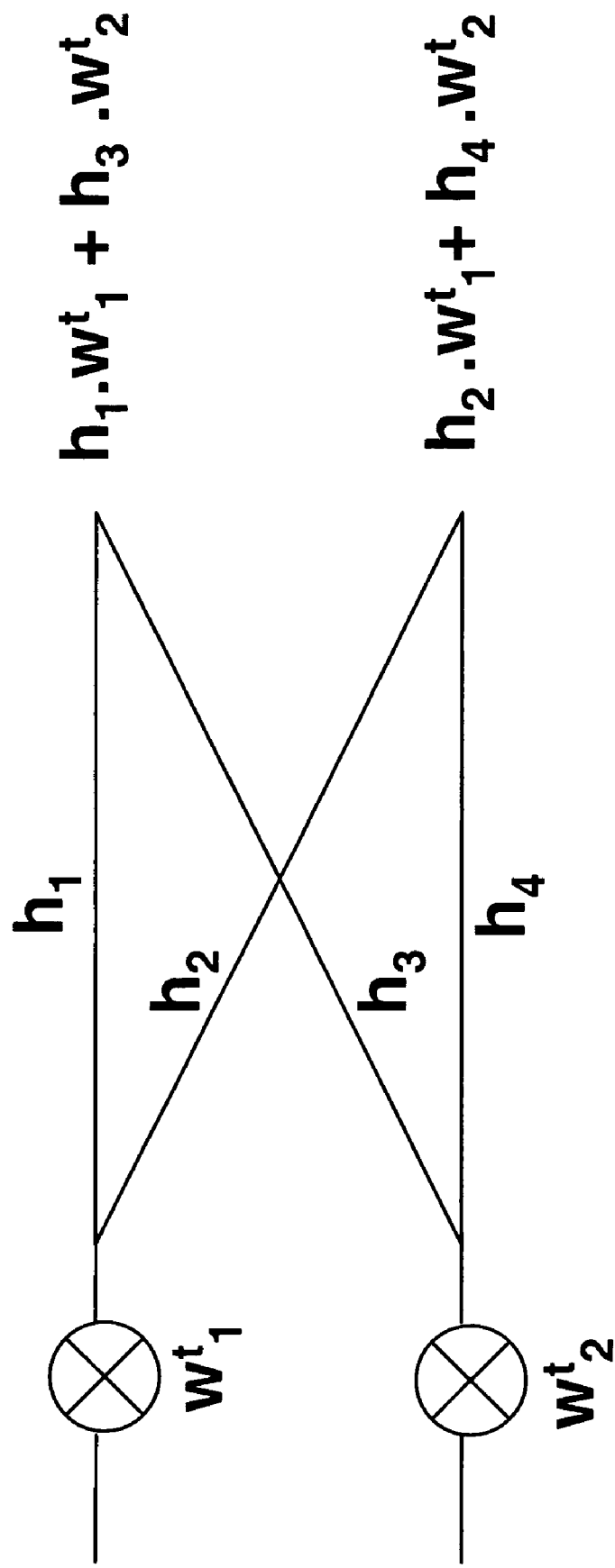
FIG. 5 illustrates a model of transmit beam-forming with weight and channel variables.

FIG. 5 illustrates a model of transmit beam-forming, for example, with two transmit antennas, two receive antennas, weights $w_1^t$, $w_2^t$ and channel responses $h_{11}$, $h_{12}$, $h_{21}$ and $h_{22}$, where the first and second subscripts denote the transmit and receiver antenna indices, respectively. FIG. 5 only shows a 2×2 antenna example, but other configurations may any number of antennas. A transmit weight vector may be expressed as:

$$w^t = \begin{bmatrix} w_1^t \\ w_2^t \end{bmatrix}, \|w^t\| = 1$$

$w^t$ can be multiple dimensional.

An effective channel coefficient vector $h_{\text{eff}}$ for a 2×2 example may be computed for each receiver antenna 300 based on the transmit weight vector $w^t$:

$$h_{\text{eff}} = H \cdot w^t = \begin{bmatrix} h_{11} w_1^t + h_{21} w_2^t \\ h_{12} w_1^t + h_{22} w_2^t \end{bmatrix}.$$

Transmit weight vector $w^t$ may be determined by specific beam-forming techniques, such as optimum beam-forming (Maximum Ratio Transmission—MRT), antenna selection, and periodically or continuously updating a phase difference across multiple Tx antennas (with equal gain combining).

For an MRT example, a standard MRT weight vector may be the dominant right singular vector ($v_1$) of the channel matrix H:

$$h_{\text{eff}} = H \cdot v_1 = (U \cdot S \cdot V^H) \cdot v_1 = \sigma_1 u_1,$$

where $\sigma_1$ is a dominant singular value, and $u_1$ is the corresponding left singular vector.

For antenna selection, a transmitter may select a Tx antenna with the highest signal strength based on channel knowledge:

$$h_{\text{eff}}^1 = H \cdot \begin{bmatrix} 1 \\ 0 \end{bmatrix} = \begin{bmatrix} h_{11} \\ h_{12} \end{bmatrix},$$

$$h_{\text{eff}}^2 = H \cdot \begin{bmatrix} 0 \\ 1 \end{bmatrix} = \begin{bmatrix} h_{21} \\ h_{22} \end{bmatrix},$$

$$|h_{11}|^2 + |h_{12}|^2 \overset{\text{antenna1}}{\underset{\text{antenna2}}{\gtreqless}} |h_{21}|^2 + |h_{22}|^2.$$

For example, an access terminal 106 may transmit on only antenna 1 for a period of time (i.e., UpdatePeriod), and then transmit on only antenna 2. The period of time may be any selectable period, such as 64 slots or 256 slots, where a slot is 1.666 . . . msec in duration. The access terminal 106 may observe an indication of the reverse link condition. Examples of such indications include (a) reverse power control (RPC) bits (described below) sent from the base station 104 and/or (b) closed loop mean Tx pilot power measured during each UpdatePeriod. The access terminal 106 may select the transmit antenna that is associated with a lower closed loop mean Tx pilot power, and use the selected antenna for a period of time, such as UpdatePeriod*2*19 slots. After that, the access terminal 106 may repeat the method described above. This method may be useful for a stationary access terminal 106.

Another method may alternate using Tx antennas at each time slot (spatial diversity).

In systems such as cdma2000 1× EV-DO, transmit beam-forming on the reverse link for access terminals 106 with multiple transmit antennas 210A-210M (FIG. 6) may lead to significant performance gains. By adjusting a complex gain or phase applied to each transmit antenna 210, an effective transmit beam pattern may be aligned optimally to allow in-phase addition of transmitted signals at the receive antenna 300, and thereby maximize the SINR of the received signal. This may lead to reduction in the access terminal's required transmit power to achieve a specific data rate, which may be used to increase the overall sector throughput, or extend the network coverage, or both.

A challenge for transmit beam-forming is acquiring knowledge of an exact channel (gain and phase) experienced by signals at the receiver (sent from each antenna at the transmitter), which is used to compute beam-forming weights. Such knowledge may require a large amount of feedback on the forward link to each access terminal 106, which may significantly limit the forward link sector capacity. It may be desirable to find transmit beam-forming techniques with minimal overhead and still achieve significant performance improvement.

Figure 6:
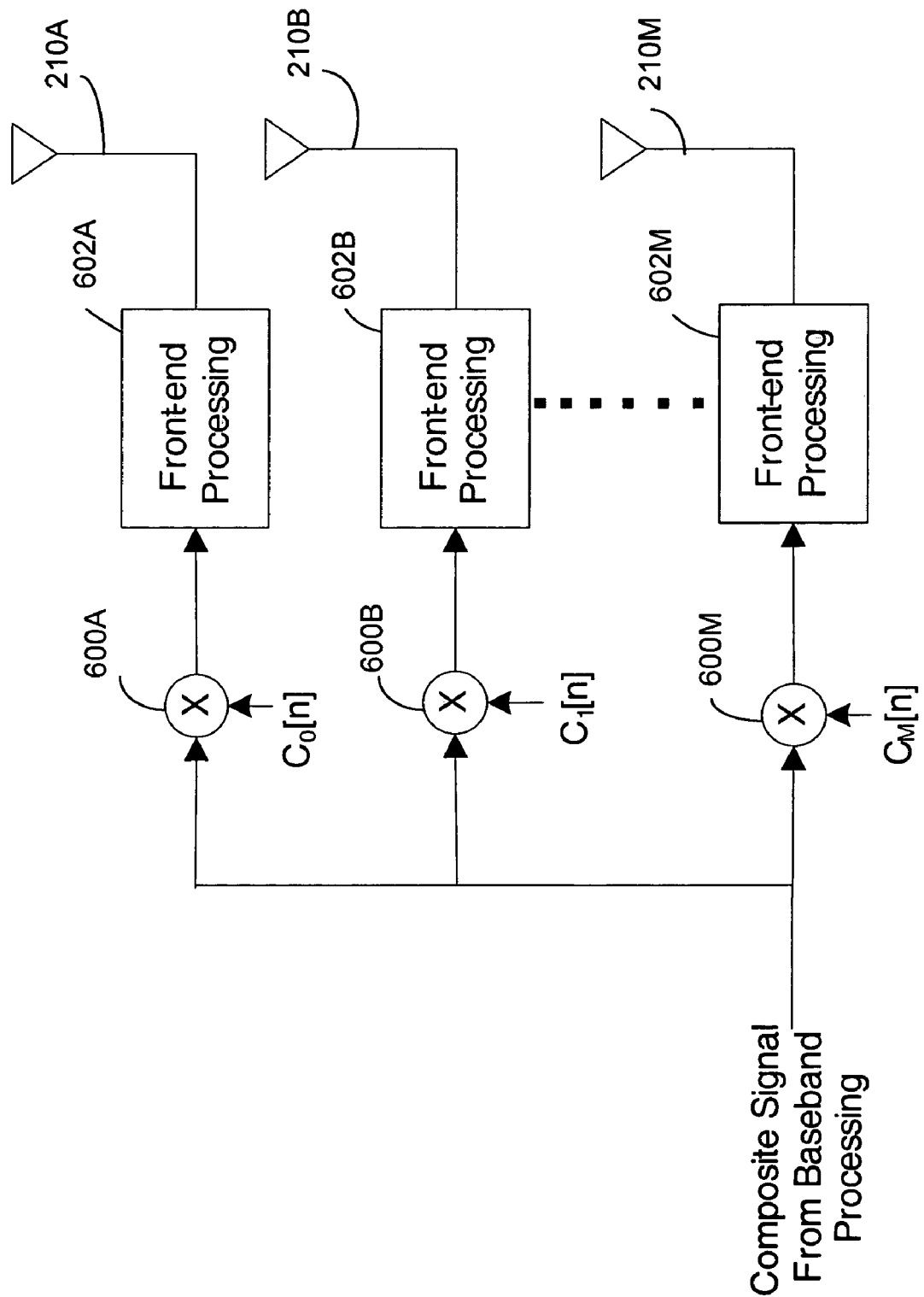
FIG. 6 illustrates a multiple antenna transmitter, which may be implemented at an access terminal of FIG. 1.

FIG. 6 illustrates a multiple antenna transmitter, which may be implemented at an access terminal 106 of FIG. 1. The transmitter of FIG. 6 comprises two or more multipliers 600A-600M, a plurality of front-end processing units 602A-602M and antennas 210A-210M. A stream of data symbols (i.e., composite signal from baseband processing in FIG. 6) to be transmitted through a communications channel to a receiver may be expressed as s[n]. Complex scaling for the mth antenna at slot n is performed by a multiplier 600M, which multiplies the composite signal with coefficient(s) $c_m[n]$ (i.e., weights). Front-end processing 602 at each antenna 210 may comprise baseband-to-radio-frequency (RF) conversion, a pulse-shaping filter, automatic gain control (AGC), and a power amplifier.

The composite received signal at each receiving antenna 300 of the base station 104 may be denoted as:

$$r_j[n] = \sum_{m=1}^{M} c_m[n] h_{m,j}^H[n] s[n] + w[n] = h_j[n]^H c[n] s[n] + w[n], \quad (1)$$

where j denotes the receiving antenna index, $h_{mj}[n]$ denotes the channel from the mth antenna to the jth receiver, s[n] denotes the desired transmitted signal, and w[n] denotes background noise, assumed to be white and Gaussian. If the transmitter knows the channel precisely, then c[n] is set to be equal to $h_j[n]$, allowing the signals to be added in phase at the receiver and thereby achieving the maximum SINR.

If w[n] is non-white, then c[n] could be adjusted dynamically based on h[n] and the interference covariance matrices of w[n] or adaptively to maximize the received signal SINR, by simultaneously maximizing the desired access terminal's signal and suppressing the interference. However, in order to perform transmit beam-forming precisely according to channel knowledge, a significant amount of overhead information may be needed, which may impact the forward link throughput.

The method described below may adapt temporal coefficients $c_m[n]$ to give a better estimate of the optimal transmit beam pattern without incurring significant feedback overhead on the forward link. The description below proposes reverse link transmit beam-forming methods that require no additional feedback information in wireless communication systems, such as cdma2000 1× and 1× EV-DO systems.

Optimization of Transmit Beam-forming Weights Based on RPC

The access terminal 106 may perform transmit beam-forming based on information sent by one or more base stations 104 on the reverse power control (RPC) channel. This method is based on adaptively minimizing the deviation of mean RPC output from zero. In addition to the aforementioned beam-forming benefits, this method may also reduce forward/reverse link imbalance, and thereby improve the coverage and capacity of delay sensitive applications.

RPC and reverse link power control are described in co-assigned U.S. Pat. No. 6,678,257, entitled "Methods and apparatus for allocation of power to base station channels," and U.S. Pat. No. 6,687,510, entitled "Methods and apparatus for power allocation on a reverse link power control channel of a communication system," which are hereby incorporated by reference in their entireties. RPC is also described in the IS-95, cdma2000, and EV-DO standards mentioned above.

"Open loop" power control refers to an access terminal 106 adjusting its RL transmit power (TxGainAdjust) according to power levels of received FL signals from one or more base stations 104.

"Closed loop" power control refers to a base station 104 measuring a signal strength of RL signals from an access terminal 106, comparing the signal strength of the RL signals to a threshold, and sending RPC bits to the access terminal 106. The access terminal 106 may use the RPC bits from one or more base stations to increase or decrease its mean RL Tx pilot power. "Closed loop" power control may be faster than "open loop" power control.

Figure 7:
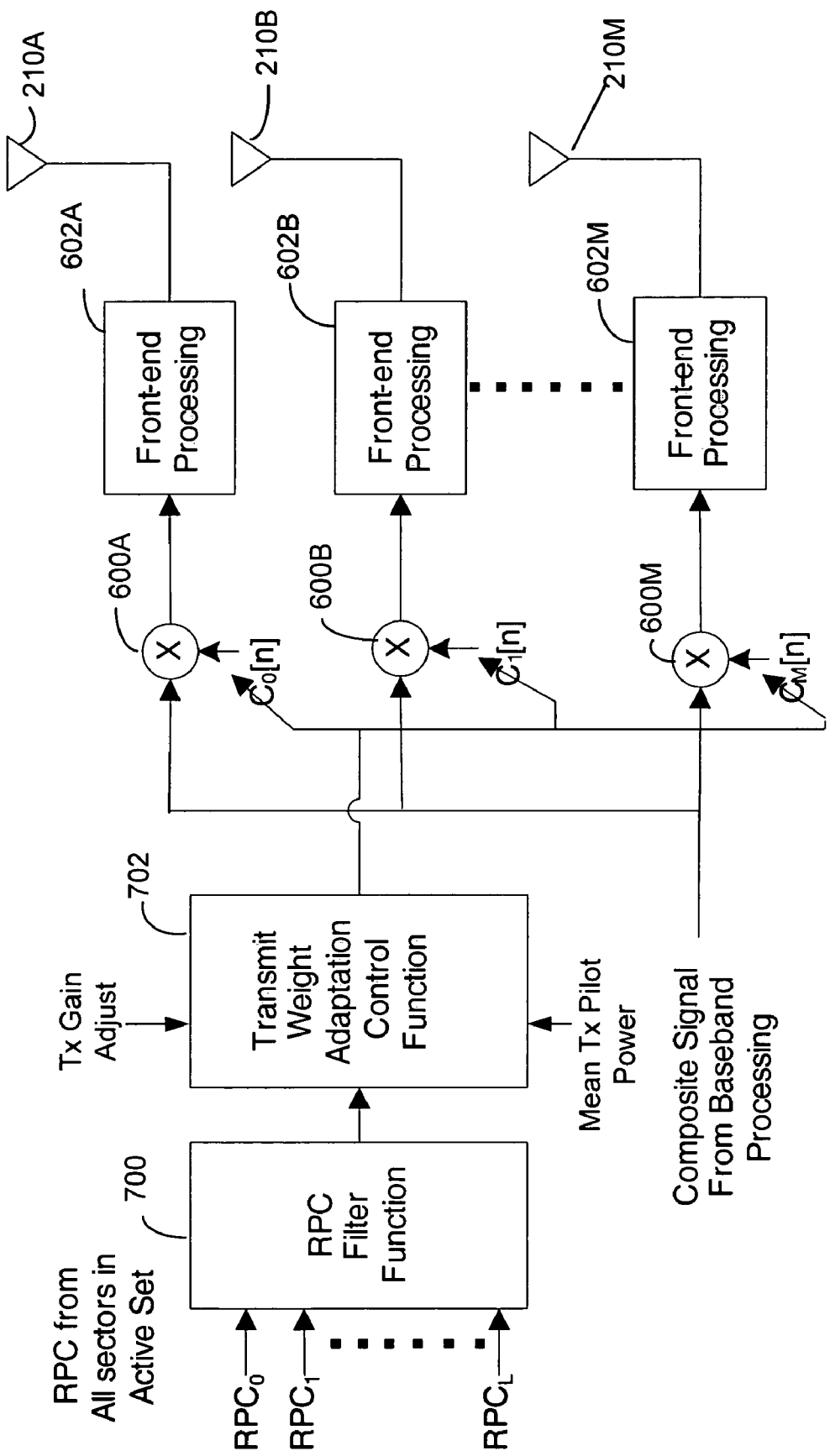
FIG. 7 illustrates a multiple antenna transmitter with an adaptation control function, which may be implemented at an access terminal of FIG. 1.

FIG. 7 illustrates a multiple antenna transmitter, which may be implemented at an access terminal 106 of FIG. 1. The transmitter of FIG. 7 comprises a RPC channel filter function or unit 700, a transmit weight adaptation control function or unit 702, a plurality of multipliers 600A-600M, front-end processing units 602A-602M and antennas 210A-210M.

The transmit weight adaptation control function 702 may use information, such as RPC channel bits, and closed loop power adjustment to determine complex gain coefficients (i.e., weights) $c_0[n]$ to $c_M[n]$. The complex gain coefficients $c_0[n]$ to $c_M[n]$ may contain both gain and phase information.

A rationale for using either the RPC channel or the closed loop power adjustment is that they provide side information about the reverse link signal quality seen at the receiving base stations 104. For example, a filtered RPC value close to 0 implies that the access terminal's transmit power is at the right level to achieve the desired link performance, while a large positive filtered RPC value indicates that the signal quality at the receiving base station 104 is too low. Similarly, a large increase in closed loop power adjustment indicates that the instantaneous reverse link condition is poor and signal quality at the receiving base station is too low, while a decrease in closed loop power adjustment indicates that the signal quality at the receiving base station is well above the required signal quality, in which case the access terminal is instructed to lower the pilot transmit power to reduce interference to other access terminals.

Filtered RPC

The transmit weight adaptation control function 702 may set, determine, select, adapt or adjust beam-forming weights of each antenna 210 based on a current "filtered RPC" value from the RPC filter function 700. The adaptation control function 702 may adjust the beam-forming weights so that (or until) the filtered RPC value is as close to zero as possible. Also, if the filtered RPC value is negative, implying that the current received SINR is better than a desired threshold, the access terminal 106 may freeze the adaptation loop.

As an example, the "filtered RPC" may be defined as:

$$\mathrm{filt}RPC(n) = (1-\alpha)\,\mathrm{filt}RPC(n-1) + \alpha \cdot f(RPC_0(n), RPC_1(n), \ldots, RPC_L(n)), \quad (6)$$

where α denotes a constant for an infinite impulse response filter, filtRPC(n−1) denotes a filtered RPC of the previous slot (n−1), $RPC_i(n)$ denotes the RPC bit received at current slot n from the ith cell in the active set, and $f(RPC_0(n), \ldots RPC_L(n))$ denotes an "effective RPC" or "EffRPC." Examples of the effective RPC $f$ may include:

(1) logical OR function of all RPC bits sent from cells in the access terminal's active set, i.e., OR-of-the-downs, where "downs" refer to RPCs with zero value; or (2) the RPC bit sent from the serving sector only, i.e., $RPC_0(n)$ only.

Using the first function f attempts to minimize the reverse link transmit power (e.g., Tx pilot power) for a given target data rate. Using the second function $f$ attempts to steer the beam towards the serving cell antenna 300 to optimize the link condition between the AT 106 and the serving base station 104. An additional advantage of using the second function $f$ is helping to balance the forward and reverse links of an AT 106 in relative static conditions, and thereby improve the overall link efficiency.

Accumulated RPC (AccumRPC) is the accumulated effective RPC commands received during an UpdatePeriod (e.g., 64 slots or 256 slots). AccumRPC(k,n) is a measure of the k-th slot closed loop pilot Tx power of the n-th UpdatePeriod.

$$AccumRPC(k, n) = \sum_{i=1}^{k} EffRPC((n-1)UpdatePeriod + i),$$

$$k \leq UpdatePeriod.$$

The filtered RPC value may be computed as:

$$filtRPC(n) = \sum_{k=1}^{UpdatePeriod} AccumRPC(k, n).$$

If the measurement of the mean closed loop Tx pilot power is not readily available, the filtRPC value is a measure of the mean closed loop Tx pilot power during the UpdatePeriod. The access terminal 106 may compare the filtRPC of one UpdatePeriod with the filtRPC of the next UpdatePeriod.

Gain Adaptation

For a two-antenna transmitter, the overall transmitted signal at slot n may be denoted as:

$$x(t) = (\sqrt{G(n)} e^{j\phi_1(n)} + \sqrt{1-G(n)} e^{j\phi_2(n)}) \cdot s(t), \quad (2)$$

where G(n) denotes the transmitted power from the first antenna, 1−G(n) denotes the transmitted power from the second antenna, and $\phi_1(n)$ and $\phi_2(n)$ denote the transmitted signal phases from antennas 1 and 2, respectively. In equation (2) and other equations herein, the variables may be expressed as functions of slot n or time t, e.g., s[n] may be expressed as s(t). To preserve the total power, the transmitted signal power from the two antennas (G(n) and 1−G(n)) adds up to 1 (total power of two antennas should be equal to power of a single antenna case).

To obtain the optimal transmit beam pattern based on the filtered RPC value, G(n) may be adapted as:

$$G(n) = G(n-1) + \mu \cdot z(n-1), \quad (3)$$

where G(n−1) is the previous value of G(n), μ is a selected constant step size, and z(n−1) could be a function of a past filtered RPC value, current TxGainAdjust (from open loop power control), as well as the current gain and phase used on the given antenna 210. An example of z(n) could be:

$$z(n) = \max(\text{filt}RPC(n), 0) \cdot (\text{filt}RPC(n-1) - \text{filt}RPC(n)) \cdot \text{sign}(G(n-2) - G(n-1)), \quad (4)$$

where sign means positive or negative.

The beam-forming using gain adjustments/updates may be continuous or periodic.

Phase Adaptation

In addition to or instead of gain adaptation, the access terminal 106 may vary the phase of signals transmitted at each antenna. For example, for an access terminal with two transmit antennas, the access terminal may adjust the phase difference ($\phi_1(n) - \phi_2(n)$) of signals transmitted by the two antennas 210. One method may update the phase difference by a certain amount periodically so that an entire space from 0 to 2π is covered. The amount of change can be made a function of the current RPC value, the past filtered RPC value, current TxGainAdjust which is a measure of the closed-loop pilot power adjustment, as well as the current transmitted powers at the antennas 210A-210M. When the current received SINR is much lower than the desired level, the phase difference can be varied by a certain amount every update period, in search of weights that result in more coherent combining of the signals at the receiver. If the SINR is above the desired level, the phase difference can be fixed or slowed down to take advantage of the current combining weights.

The phase adaptation loop may be run simultaneously or sequentially with the gain adaptation scheme mentioned above in (3). Alternatively, phase adaptation may be used with equal gain combining, i.e., the access terminal 106 may distribute total power equally across two Tx antennas 210, and apply θ degrees of phase difference to the second Tx antenna:

$$\begin{bmatrix} w_1 \\ w_2 \end{bmatrix} = \begin{bmatrix} \sqrt{0.5} \\ \sqrt{0.5} \cdot e^{j\theta(n)} \end{bmatrix}$$

$$h_{\text{eff}} = \begin{bmatrix} \sqrt{0.5}\, h_1 + \sqrt{0.5}\, h_3 \cdot e^{j\theta(n)} \\ \sqrt{0.5}\, h_2 + \sqrt{0.5}\, h_4 \cdot e^{j\theta(n)} \end{bmatrix}.$$

The access terminal 106 may determine the phase adaptation using one of two different approaches: a periodic update or a continuous update.

Phase Adaptation—Periodic Update

The access terminal 106 may periodically trigger a "phase sweep": the access terminal 106 sequentially transmits on both antennas using a discrete set of X phase differences (such as 10 phase differences), each separated by Y degrees, such as 20 or 60 degrees (called PhaseStep) from 0 to 360 degrees. These are just examples, and any number of phase differences and PhaseSteps may be used. The access terminal 106 may use each phase difference for a designated time period (called UpdatePeriod, e.g., 64-slots) and compute the mean Tx pilot power. After trying all phase differences in the set, the access terminal 106 may pick the phase with the least (minimum) measured mean Tx pilot power, and use that phase until the next "phase sweep," e.g., for a time longer than the Phase Sweep duration, such as 10×64×19 slots (based on an example of 20-degree PhaseStep), for example. This process may be called a type of beam pattern selection.

A variation of the method above may include antenna 1 only and antenna 2 only transmissions among the phase sweep options, as well as alternating antennas every other slot.

Instead of phase, the adaptation control function 702 may use a fixed set of different gains in the method described above.

Phase Adaptation—Continuous Update

In a second approach, the access terminal 106 may continuously update the phase difference ("phase adapt") using a Least Means Square (LMS) algorithm. This update mechanism may use two inputs: (1) RPC bits of the active cells around the access terminal 106 and/or (2) mean Tx pilot power. This may be called a type of adaptive beam forming.

The access terminal 106 may update the phase every UpdatePeriod slots, where μ is the PhaseStep:

$$\theta(n)=\theta(n-1)+\mu \cdot z(n-1) \text{ where } n \text{ is the UpdatePeriod index.}$$

The input to the adaptation scheme may be only the RPC bits of the active cells.

$$\{0, \text{ if filt}RPC(n-1)=\text{filt}RPC(n-2)$$

$$z(n-1)=\{-\text{sign}(\theta(n-1)-\theta(n-2)), \text{ if filt}RPC(n-1)>\text{filt}RPC(n-2)$$

$$\{+\text{sign}(\theta(n-1)-\theta(n-2)), \text{ if filt}RPC(n-1)<\text{filt}RPC(n-2)$$

Instead of using RPC bits, the adaptation control function 702 may use mean Tx pilot power to perform phase adaptation. The input to the adaptation control function 702 is the mean Tx pilot power:

$$\{0, \text{ if Mean}TxPilotPower(n-1)=\text{Mean}TxPilotPower(n-2)$$

$$z(n-1)=\{-\text{sign}(\theta(n-1)-\theta(n-2)), \text{ if Mean}TxPilotPower(n-1)>\text{Mean}TxPilotPower(n-2)$$

$$\{+\text{sign}(\theta(n-1)-\theta(n-2)), \text{ if Mean}TxPilotPower(n-1)<\text{Mean}TxPilotPower(n-2).$$

Figure 8:
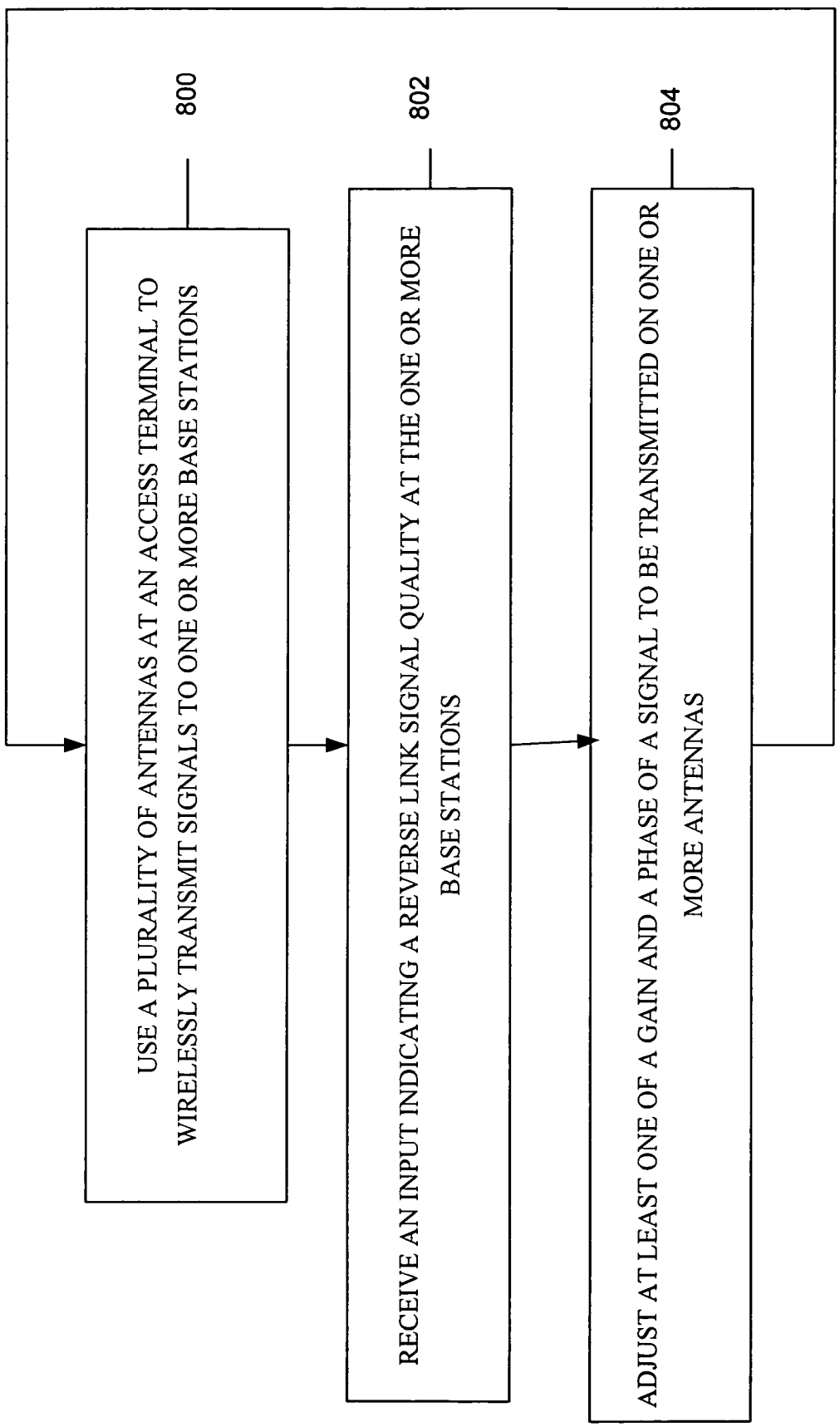
FIG. 8 illustrates a method of using the access terminal of FIG. 1.

FIG. 8 illustrates a method of using the access terminal 106 of FIG. 1. Block 800 uses a plurality of antennas 210A-210M at an access terminal 106 to wirelessly transmit signals to one or more base stations 104. Block 802 receives an input indicating a reverse link signal quality at the one or more base stations 104. Block 804 adjusts at least one of a gain and a phase of a signal to be transmitted on one or more antennas 210A-210M. After block 804, the method may return to block 800.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium. A storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An access terminal comprising:
    a plurality of antennas configured to wirelessly transmit signals to one or more base stations; and
    a coefficient adaptation control unit configured to receive a reverse power control (RPC) value sent from one or more base stations and adjust at least one of a gain and a phase of a signal to be transmitted on one or more antennas until the RPC value is close to zero.

2. The access terminal of claim 1, wherein the access terminal further comprises a RPC filter function configured to receive RPC bits sent from multiple base stations and output a filtered RPC value to the coefficient adaptation control unit.

3. The access terminal of claim 2, wherein the RPC filter function determines the filtered RPC value as:

$$\text{filt}RPC(n)=(1-\alpha)\text{filt}RPC(n-1)+\alpha \cdot f(RPC_0(n),RPC_1(n),\ldots,RPC_L(n))$$

where α denotes a constant for an infinite impulse response filter, filtRPC(n−1) denotes a filtered RPC of a previous time slot (n−1), $RPC_i(n)$ denotes a RPC bit received at current slot n from the ith cell in an active set of base stations, and $f(RPC_0(n), \ldots RPC_L(n))$ denotes an effective RPC.

4. The access terminal of claim 3, wherein the effective RPC comprises a logical OR function of all RPC bits sent from base stations in the access terminal's active set.

5. The access terminal of claim 3, wherein the effective RPC comprises a RPC bit sent from only a serving sector of the access terminal.

6. The access terminal of claim 2, wherein the RPC filter function determines the filtered RPC value as:

$$filtRPC(n) = \sum_{k=1}^{UpdatePeriod} AccumRPC(k, n)$$

where $$AccumRPC(k, n) = \sum_{i=1}^{k} EffRPC((n-1) \cdot UpdatePeriod + i),$$

$$k \le UpdatePeriod.$$

7. The access terminal of claim 1, wherein the input comprises a measurement of transmit pilot power.

8. The access terminal of claim 1, wherein the input comprises a transmit gain adjust value.

9. The access terminal of claim 1, wherein the coefficient adaptation control unit is configured to continuously adjust at least one of the gain and the phase of the signal to be transmitted on one or more antennas using a Least Means Square (LMS) algorithm.

10. The access terminal of claim 1, wherein the input comprises reverse power control (RPC) bits of active cells, the coefficient adaptation control unit being configured to adjust the phase of the signal to be transmitted on one or more antennas by:

$\theta(n)=\theta(n-1)+\mu \cdot z(n-1)$, where $\mu$ is the PhaseStep; and $\{0, \text{ if } filtRPC(n-1)=filtRPC(n-2)$ $z(n-1)=\{-sign(\theta(n-1)-\theta(n-2)), \text{ if } filtRPC(n-1)>filtRPC(n-2)$ $\{+sign(\theta(n-1)-\theta(n-2)), \text{ if } filtRPC(n-1)<filtRPC(n-2).$ 11. The access terminal of claim 1, wherein the input comprises measured mean transmit pilot power, the coefficient adaptation control unit being configured to adjust the phase of the signal to be transmitted on one or more antennas by:

$\theta(n)=\theta(n-1)+\mu \cdot z(n-1)$, where $\mu$ is the PhaseStep; and $\{0, \text{ if } MeanTxPilotPower(n-1)=MeanTxPilotPower(n-2)$ $z(n-1)=\{-sign(\theta(n-1)-\theta(n-2)), \text{ if } MeanTxPilotPower(n-1)>MeanTxPilotPower(n-2)$ $\{+sign(\theta(n-1)-\theta(n-2)), \text{ if } MeanTxPilotPower(n-1)<MeanTxPilotPower(n-2).$ 12. The access terminal of claim 1, wherein the coefficient adaptation control unit is configured to periodically adjust at least one of the gain and the phase of the signal to be transmitted on one or more antennas.

13. The access terminal of claim 12, wherein the coefficient adaptation control unit is configured to (a) for each time period, apply a phase difference between two or more antennas, (b) determine a mean transmit pilot power during each time period, and (c) after using a discrete set of phase differences, select the phase difference with a least mean transmit pilot power and use that phase difference.

14. The access terminal of claim 12, wherein the coefficient adaptation control unit is configured to (a) for each time period, apply a gain difference between two or more antennas, (b) determine a mean transmit pilot power during each time period, and (c) after using a discrete set of gain differences, select the gain difference with a least mean transmit pilot power and use that gain difference.

15. The access terminal of claim 1, further comprising a plurality of multipliers, each multiplier being coupled to the coefficient adaptation control unit and a designated signal path of one of the antennas, each multiplier being configured to multiply a complex gain coefficient from the coefficient adaptation control unit by a signal of the designated signal path.

16. A method comprising:
using a plurality of antennas at an access terminal to wirelessly transmit signals to one or more base stations;
receiving a reverse power control (RPC) value sent from one or more base stations; and
adjusting at least one of a gain and a phase of a signal to be transmitted on one or more antennas until the RPC value is close to zero.

17. The method of claim 16, further comprising:
receiving RPC bits sent from multiple base stations; and
generating a filtered RPC value based on the received RPC bits sent from multiple base stations.

18. A method of beam-forming using antennal selection, the method comprising:
wirelessly transmitting a signal on a first antenna for a first period of time;
wirelessly transmitting the signal on a second antenna for a subsequent period of time;
observing at least one of (a) reverse power control (RPC) bits sent from one or more base stations and (b) closed loop mean transmit pilot power measured during each period;
selecting the antenna that is associated with a lower closed loop mean transmit pilot power; and
using the selected antenna for a second period longer than the first period.

19. An access terminal comprising:
a plurality of antenna means configured to wirelessly transmit signals to one or more base stations; and
coefficient adaptation control means configured to receive a reverse power control (RPC) value sent from one or more base stations and adjust at least one of a gain and a phase of a signal to be transmitted on one or more antennas until the RPC value is close to zero.

20. A computer-readable storage medium having instructions thereon, the instructions comprising:
code for receiving a reverse power control (RPC) value sent from one or more base stations; and
code for adjusting at least one of a gain and a phase of a signal to be transmitted on one or more antennas until the RPC value is close to zero.

* * * * *